July 13, 1926.
G. M. ANDERSON ET AL
1,592,412
BISCUIT REMOVAL MEANS
Original Filed Sept. 7, 1922
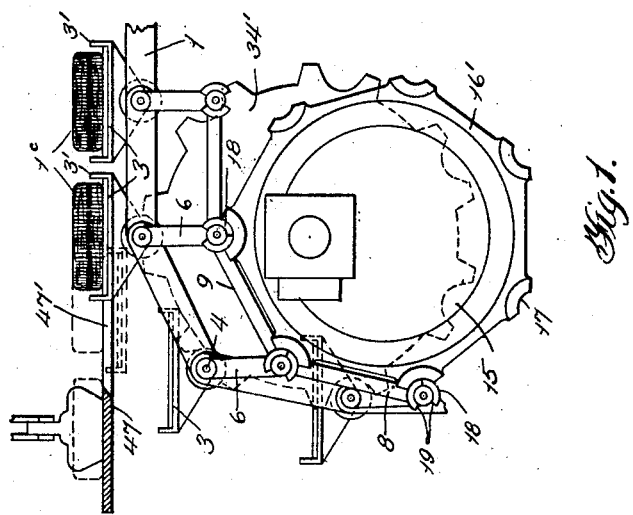
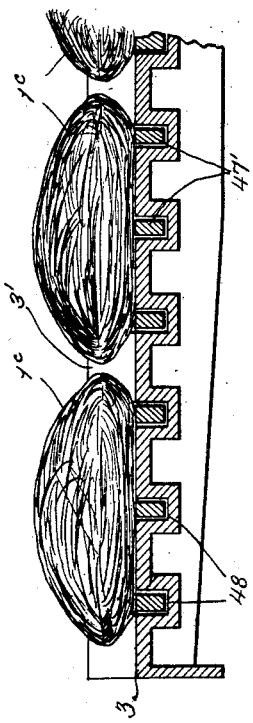
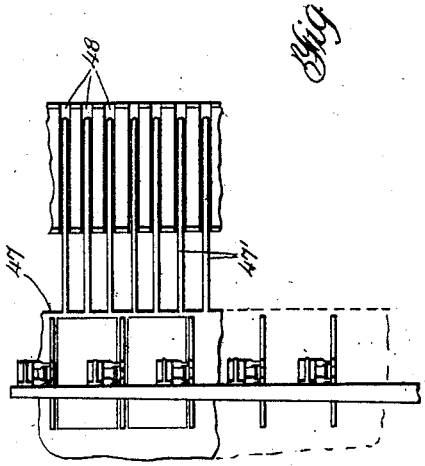
Inventors
G. M. Anderson.
Stuart Hilder.
E. W. Anderson Jr.
By
Attorneys Patented July 13, 1926.

1,592,412

UNITED STATES PATENT OFFICE.

GEORGE M. ANDERSON, OF WASHINGTON, DISTRICT OF COLUMBIA, AND STUART HILDER, OF GLENCARLYN, VIRGINIA, ASSIGNORS TO THE SHREDDED WHEAT COMPANY, OF NIAGARA FALLS, NEW YORK, A CORPORATION OF NEW YORK.

BISCUIT-REMOVAL MEANS.

Original application filed September 7, 1922, Serial No. 586,705. Divided and this application filed November 2, 1923, Serial No. 672,374. Renewed May 17, 1926.

Figure 1 is a side view of the invention, partly broken away.

Figure 2 is a fragmentary top plan view of the same.

Figure 3 is an enlarged fragmentary cross-sectional view of a conveyor tray and the engaging teeth of the removal device.

The invention has relation to means for manufacturing cereal filamentous biscuit, having for an object the provision of means for removing baked cereal filamentous biscuit from a conveyor during the movement of the portion of said conveyor from which the biscuit are removed.

The invention consists in the novel construction and combinations of parts, as set forth in the appended claims.

In the accompanying drawings, illustrating an embodiment of the invention applied to a machine constructed in accordance with the disclosure of co-pending application Serial No. 586,705, filed September 7, 1922, of which the present is a divisonal application, the numeral 1 designates a conveyor, provided with pans or trays 3 adapted each to carry a transverse row of biscuit 1ᶜ. The conveyor 1 extends horizontally to sprocket wheel 34′ and vertically downward therefrom, the trays 3 being maintained in upright position during the passage over said sprocket by any suitable means; for instance by the means shown in the application for patent of E. P. Webster, Serial No. 552,037 filed April 12, 1922.

According to this construction the pivot rods 4 of the conveyor chain links are provided with depending crank extensions 6, the lower ends of which are offset to form the pivots of the links 8 of a supplementary sprocket chain 9, both chains being endless and of the same length over-all. The two chains, connected by the crank extensions 6, form a parallel movement chain couple, whereof the links move in parallel and the connecting extensions move in parallel.

The journal boxes of the sprocket wheel shafts are provided each with a depending eccentric 15, held stationary by the box and carrying a sprocket wheel or annulus 16′ loose thereon, said eccentrics having their centers in the same vertical planes as the axial centers of the related shafts. The seats 17 of the sprockets 16′ are engaged by end heads 18 of the links 8, said heads having angularly related radial shoulders 19, the shoulders of the adjacent heads of different links contacting with each other as the supplementary chain passes around a sprocket wheel 16′.

The sprocket wheels 16′ serve as guide sprockets or idlers and, together with the action of the shoulders 19, are adapted to prevent any movement of the supplementary chain that would throw the trays out of horizontal position, since said trays are rigidly mounted upon the rods 4.

Prior to the downward movement of the trays from sprocket 34′, the teeth 47′ of a stationary biscuit removal device or comb 47 will engage transverse grooves 48 of the bottoms of the trays 3, beneath the biscuit 1ᶜ in said trays, whereupon the trays will pass downwardly as the chain passes downwardly around the sprocket, away from and below said teeth, which will uphold the biscuit resting thereon. At the same time, the rear flanges or sides 3′ of said trays will push the biscuit along the teeth of the comb, until said flanges pass below the tops of said teeth, from the position shown in full lines to the position shown in dotted lines in Figure 1. The succeeding tray 3 now coming along, its front flange 3′ will engage the biscuit resting upon said teeth and will further push the same along over said teeth; the entire movement of the biscuit row along said teeth by the push of both front and rear flanges of the tray being approximately the length of a biscuit and a half.

In this way the removal means for the biscuit, being stationary, is not required to be timed with the movement or stoppage of the trays 3; the movement of the trays being taken advantage of to cause the removal of the biscuit therefrom, and with a minimum of disturbance or vibration of the delicate biscuit. The trays, being provided with grooves in their bottoms, will not be weakened, and as these recesses would not be more than $\frac{3}{16}$ of an inch in width, and the spaces between said grooves about $\frac{1}{2}$ inch in width, there will be slight danger of any objectionable sinking of the soft material of the biscuit into said grooves prior to baking. The grooves 48 would be tapered at their front ends, as would also the points of the teeth 47', the latter being about ⅛ of an inch in thickness, so that proper engagement of the teeth with the grooves will be assured.

In the construction herein disclosed the biscuit are pushed by the tray flanges 3' onto a platform 56, from which they may be removed by any suitable means, for instance by means of the rake device disclosed in the copending application for patent of E. P. Webster, Serial No. 571,825, filed June 29, 1922. This rake is designated by the numeral 16, and is provided with teeth 25.

We claim:

1. In a machine of the character described, a conveyor including trays, and means cooperating with said conveyor to remove biscuit from said trays, the conveyor acting to advance the removed biscuit from successive trays in successive spaced rows.

2. In a machine of the character described, a conveyor, sheet form horizontally grooved trays carried thereby, and a comb having teeth adapted to register with the grooves and to remove biscuit from said trays.

3. In a machine of the character described, a conveyor, sheet form rectangular horizontally corrugated trays carried thereby, and a comb having teeth adapted to register with the grooves and to remove biscuit from said trays.

4. In a machine of the character described, a conveyor, grooved trays carried thereby and having flanges, and a comb having teeth adapted to register with the grooves of said trays, the conveyor being adapted to deposit biscuit upon said comb and said flanges being adapted to move the biscuit along said comb beyond the point of deposit.

5. In a machine of the character described, a conveyor, grooved trays carried thereby and having sectional end flanges between the grooves, and a comb having teeth adapted to register with the grooves of said trays, the conveyor being adapted to deposit biscuit upon said comb and said flanges being adapted to move the biscuit along said comb beyond the point of deposit.

6. In a machine of the character described, a conveyor including trays and means for maintaining said trays constantly in upright position, and stationary means cooperating with a downwardly movable portion of said conveyor to remove biscuit from said trays, the conveyor acting to advance the removed biscuit horizontally.

In testimony whereof we affix our signatures.

GEORGE M. ANDERSON.
STUART HILDER.